(12) United States Patent
Botts et al.

(10) Patent No.: US 11,588,435 B2
(45) Date of Patent: Feb. 21, 2023

(54) INTELLIGENT CIRCUIT CONTROL FOR SOLAR PANEL SYSTEMS

(71) Applicant: Premergy, Inc., Macon, GA (US)

(72) Inventors: Richard Edward Botts, Griffin, GA (US); Blakely Lane Fabiani, Auburn, AL (US)

(73) Assignee: Premergy, Inc., Macon, GA (US)

( * ) Notice: Subject to any disclaimer, the term of this patent is extended or adjusted under 35 U.S.C. 154(b) by 155 days.

(21) Appl. No.: 17/219,290

(22) Filed: Mar. 31, 2021

(65) Prior Publication Data

US 2021/0281214 A1 Sep. 9, 2021

Related U.S. Application Data

(63) Continuation of application No. 16/928,547, filed on Jul. 14, 2020, now Pat. No. 10,992,256, which is a continuation of application No. 15/861,717, filed on Jan. 4, 2018, now Pat. No. 10,749,354, which is a continuation-in-part of application No. 15/700,158, filed on Sep. 10, 2017, now Pat. No. 10,017,056.

(51) Int. Cl.
| | |
|---|---|
| *H02S 40/38* | (2014.01) |
| *H02J 7/00* | (2006.01) |
| *H02S 40/42* | (2014.01) |
| *H02S 40/40* | (2014.01) |
| *H02K 19/18* | (2006.01) |
| *H02J 7/35* | (2006.01) |
| *H02J 7/14* | (2006.01) |
| *B60L 53/14* | (2019.01) |

(52) U.S. Cl.
CPC ............ *H02S 40/38* (2014.12); *H02J 7/0024* (2013.01); *H02J 7/35* (2013.01); *H02K 19/18* (2013.01); *H02S 40/40* (2014.12); *H02S 40/425* (2014.12); *B60L 53/14* (2019.02); *H02J 7/1423* (2013.01)

(58) Field of Classification Search
CPC ...................................................... H02S 40/38
USPC ........................................................ 320/101
See application file for complete search history.

(56) References Cited

U.S. PATENT DOCUMENTS

| | | |
|---|---|---|
| 6,018,199 A | 1/2000 | Shiroyama et al. |
| 6,051,905 A | 4/2000 | Clark |
| 6,265,091 B1 | 7/2001 | Pierson et al. |

(Continued)

*Primary Examiner* — Edward Tso
*Assistant Examiner* — Ahmed H Omar
(74) *Attorney, Agent, or Firm* — Eversheds Sutherland (US) LLP

(57) ABSTRACT

Systems and methods are disclosed for intelligent circuit control for solar panel systems. In one embodiment, an example method may include determining, by a controller, that a first electrical output of a first solar panel configured to charge a plurality of rechargeable batteries is greater than a second electrical output of a second solar panel configured to charge the plurality of rechargeable batteries, and causing the second solar panel to be disconnected from the plurality of rechargeable batteries. Example methods may include determining that a voltage potential of the plurality of rechargeable batteries is greater than a total output voltage, where the total output voltage is a sum of the first electrical output and the second electrical output, and causing a connection between the plurality of rechargeable batteries to be changed from a series connection to a parallel connection based at least in part on the first electrical output.

20 Claims, 9 Drawing Sheets

(56) References Cited

U.S. PATENT DOCUMENTS

| | | | |
|---|---|---|---|
| 7,362,026 B2 | 4/2008 | Morozov et al. | |
| 7,938,092 B2 | 5/2011 | Yang | |
| 8,164,228 B1 | 4/2012 | Botts | |
| 8,633,671 B2 | 1/2014 | Kelly et al. | |
| 9,553,463 B2 | 1/2017 | Botts | |
| 2010/0147354 A1 | 6/2010 | Takehara et al. | |
| 2010/0198424 A1* | 8/2010 | Takehara | H01L 31/02021 700/297 |
| 2010/0231162 A1* | 9/2010 | Gibson | B60L 8/00 320/101 |
| 2010/0289446 A1 | 11/2010 | Jang | |
| 2012/0083948 A1 | 4/2012 | Tate, Jr. et al. | |
| 2012/0330488 A1 | 12/2012 | Sadler | |
| 2017/0308110 A1 | 10/2017 | Ahmed et al. | |

* cited by examiner

INTELLIGENT CIRCUIT CONTROL FOR SOLAR PANEL SYSTEMS

CROSS-REFERENCE TO RELATED APPLICATIONS

This application is a continuation of U.S. application Ser. No. 16/928,547, filed Jul. 14, 2020, which is a continuation of U.S. application Ser. No. 15/861,717, filed Jan. 4, 2018 and issued as U.S. Pat. No. 10,749,354, which is a continuation-in-part of U.S. application Ser. No. 15/700,158, filed Sep. 10, 2017 and issued as U.S. Pat. No. 10,017,056, the entireties of which are hereby incorporated by reference.

FIELD OF THE DISCLOSURE

The present disclosure relates generally to solar panel systems, and more particularly to intelligent circuit control for solar panel systems.

BACKGROUND OF THE DISCLOSURE

Electric vehicles may use batteries to power the vehicle. Specific battery capacity and consumption rates may determine a range of driving distance for the electric vehicle. In addition, once batteries of the electric vehicle are drained, charging the batteries for subsequent use may be time consuming. Further, charging the batteries with high voltages to reduce charging times may damage the batteries. Accordingly, electric vehicles that have increased driving distance ranges and batteries that can be safely charged in short lengths of time may be desired.

In addition, solar panel systems may be inefficient when charging power receptacles due to differences in electrical configuration of the power receptacles. As a result, energy generated by solar panels may be lost or uncaptured. More efficient systems of capturing energy generated by solar panels may be desired.

Figure 1:
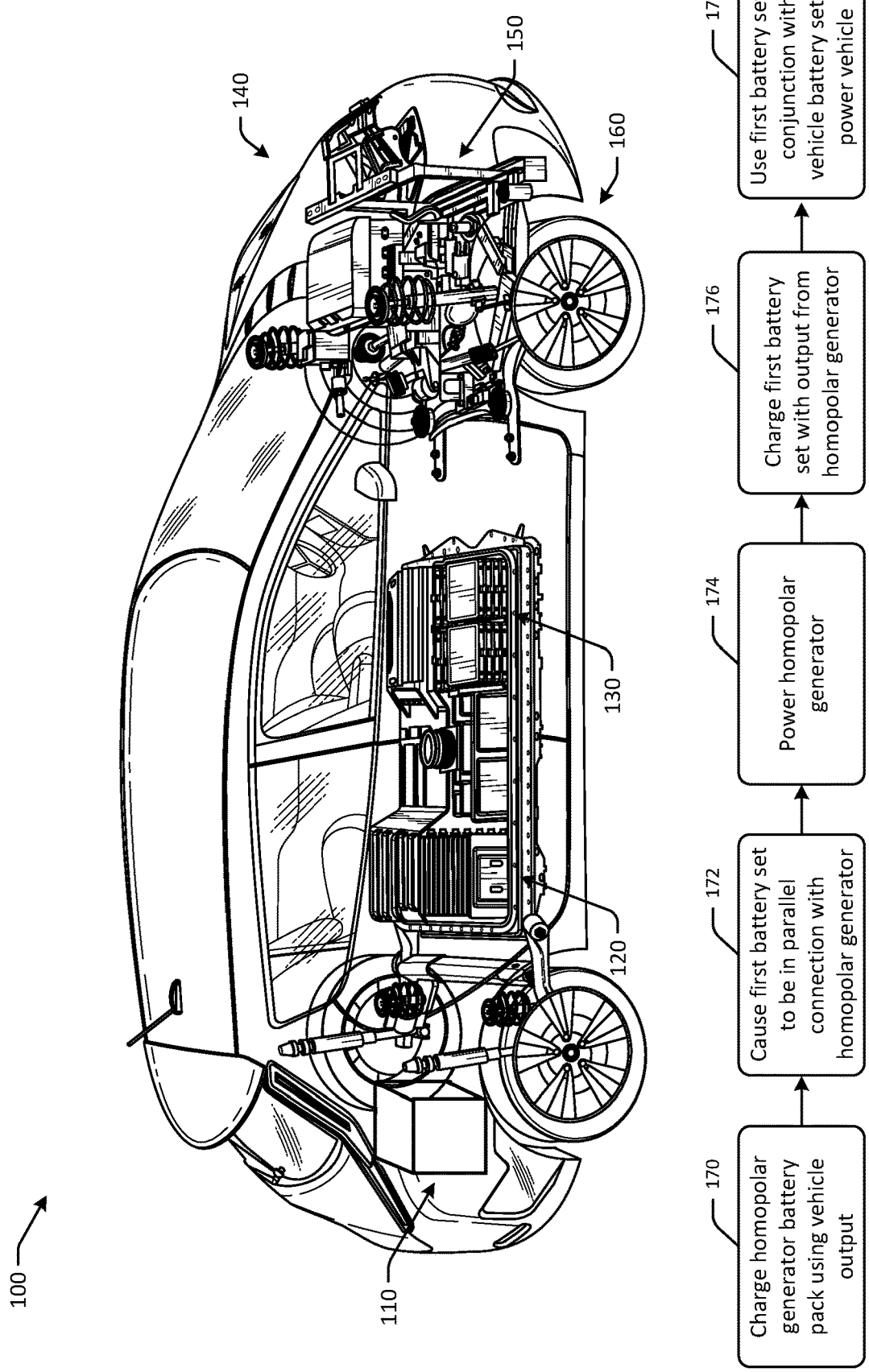
FIG. 1 schematically illustrates an example electric vehicle with a removable homopolar generator for increased driving distance and an example process flow in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION OF THE DISCLOSURE

Overview

Electric vehicles may use one or more rechargeable batteries to power the electric vehicle. For example, energy stored in batteries may be used to drive one or more motors and impart rotational motion to one or more of the wheels of the vehicle. The batteries may drain over time, and may need to be recharged before subsequent usage. The range of driving distance of the electric vehicle may be based at least in part on the number and capacity of batteries used by the vehicle, as well as the weight profile of the vehicle, size, and so forth. For example, an electric vehicle with a relatively greater battery or energy storage capacity may have a greater range or driving distance without recharging than an electric vehicle with relatively less battery or energy storage. In addition, the time to recharge batteries of the electric vehicle may be time consuming and may reduce the usefulness of the electric vehicle.

Embodiments of the disclosure include electric vehicles that may have increased driving distances or ranges, as well as reduced charging times. Some embodiments may include electric vehicles with removable or fixed homopolar generators that can be used to recharge original or additional batteries of the electric vehicle. Certain embodiments may include additional batteries, thereby increasing the total battery capacity for the electric vehicle. The homopolar generators may be used to charge or recharge one or more batteries of the vehicle while the vehicle is stationary or in motion, and may be able to charge the batteries in a relatively short amount of time, compared to traditional vehicle charging schemes, by managing a voltage output from the homopolar generator and voltage input at the respective batteries. Certain embodiments may increase an amount of power available for use by the electric vehicle by dynamically configuring the batteries in a series connection or a parallel connection. Certain embodiments may also reduce charging times by charging the batteries in a parallel connection.

This disclosure relates to, among other things, systems, methods, computer-readable media, techniques, and methodologies for intelligent circuit control for solar panel systems, which may include multiple rechargeable batteries. In an example embodiment, an electric vehicle may include at least one drive motor configured to impart motion to one or more wheels of the electric vehicle. The electric vehicle may include a number of rechargeable batteries configured to power the at least one drive motor, and a homopolar generator positioned within the electric vehicle and electrically coupled to the rechargeable batteries. The homopolar generator may be configured to generate current to charge the plurality of rechargeable batteries. The electric vehicle may include one or more solid state relays electrically coupled between the rechargeable batteries, and a controller configured to manage charging of the rechargeable batteries.

As a result, embodiments of the disclosure may improve the driving distance or range of the electric vehicle by increasing battery capacity and charging during operation of the vehicle, decrease charging times via the homopolar generator and one or more solid state relays that can dynamically switch from parallel to series connections and back, and improve power output via one or more solid state relays.

Referring now to FIG. 1, an example electric vehicle 100 with a removable homopolar generator 110 for increased driving distance and an example process flow is depicted in accordance with one or more embodiments of the disclosure. The electric vehicle 100 may be any suitable electric or hybrid vehicle that is at least partially power by stored energy from, for example, one or more batteries.

The electric vehicle 100 may include a first set of batteries 120 and a second set of batteries 130. The first set of batteries 120 may be aftermarket batteries or may be associated with the homopolar generator 110. For example, the first set of batteries 120 may receive power or current output from the homopolar generator 110. The second set of batteries 130 may be original equipment or batteries that are originally provided with the electric vehicle 100. In some embodiments, the first set of batteries 120 may be positioned in a housing of the homopolar generator 110, or may be positioned elsewhere within the electric vehicle 100. Either or both the first set of batteries 120 or the second set of batteries 130 may be removable from the electric vehicle 100. The first set of batteries 120 or the second set of batteries 130 may be rechargeable batteries. For example, either or both the first set of batteries 120 or the second set of batteries 130 may be recharged by a charging system of the electric vehicle 100 or the homopolar generator 110.

The first set of batteries 120 and the second set of batteries 130 may be used to power the electric vehicle 100. For example, the electric vehicle 100 may include at least one drive motor 150 that is configured to impart motion to one or more wheels 160 of the electric vehicle 100. The drive motor 150 may be positioned in an engine area 140 or elsewhere within the electric vehicle 100.

The homopolar generator 110 may be a generator that is configured to output current and/or a specific voltage that charges one or more batteries of the first set of batteries 120 or the second set of batteries 130. The homopolar generator 110 may be positioned within the electric vehicle 100 and may be electrically coupled to the first set of rechargeable batteries 120 in the example of FIG. 1. The homopolar generator 110 may be configured to generate current to charge the first set of rechargeable batteries 120.

The first set of rechargeable batteries 120 and the second set of batteries 130 may be used to power the electric vehicle 100. For example, in the process flow of FIG. 1, at a first operation 170 a homopolar generator battery pack may be charged using the output of the electric vehicle 100. The homopolar generator battery pack may be a part of the homopolar generator 110, and may be used to power a drive motor or other component of the homopolar generator 110. The homopolar generator battery pack may be charged by one or more components of the electric vehicle 100, such as the alternator, a regenerative braking system, or another component.

At a second operation 172, the first set of batteries 120 may be caused to be in a parallel connection with the homopolar generator 110. For example, if the first set of batteries 120 includes a first battery and a second battery, the first battery and the second battery would both be caused to be in a parallel connection with respect to the homopolar generator 110, as opposed to a series connection. The parallel connection may be generated by an actuation device, a solid state relay, one or more MOSFETs, or other electrical or mechanical (or electromechanical) components.

At a third operation 174, the homopolar generator 110 may be powered. For example, operation of the homopolar generator 110 may be initiated by causing the homopolar generator battery pack to power a generator component or drive motor of the homopolar generator 110. The drive motor may cause one or more conductive discs to rotate about a shaft in the presence of an electromagnetic field, causing a current to be generated.

At a fourth operation 176, the first set of batteries 120 may be charged with output from the homopolar generator 100. The current output from the homopolar generator 110 may be used to charge the batteries in the first set of batteries 120. Because the batteries in the first set of batteries 120 are in a parallel connection with respect to the homopolar generator 110, the respective batteries in the first set of batteries 120 may charge simultaneously, thereby reducing an overall charge time. In addition, the voltage output of the homopolar generator 110 may substantially match, or may be slightly higher than, the voltage levels of the respective batteries, so as to bring the voltage level of the respective batteries up to a fully charged level. Because a difference in voltage between the output of the homopolar generator 110 and the charge level of the batteries may be regulated, charging time of the batteries may be reduced due to an increase in acceptance of the current by the batteries 120 from the homopolar generator 110.

At a fifth operation 178, the first set of batteries 120 may be used in conjunction with the vehicle battery set, or the second set of batteries 130, to power the vehicle. The first set of batteries 120 and the second set of batteries 130 may be dynamically arranged in a series or parallel configuration during discharging, so as to provide additional power to the electric vehicle 100 if needed, or to provide additional driving distance to the electric vehicle 100 if needed.

Figure 2:
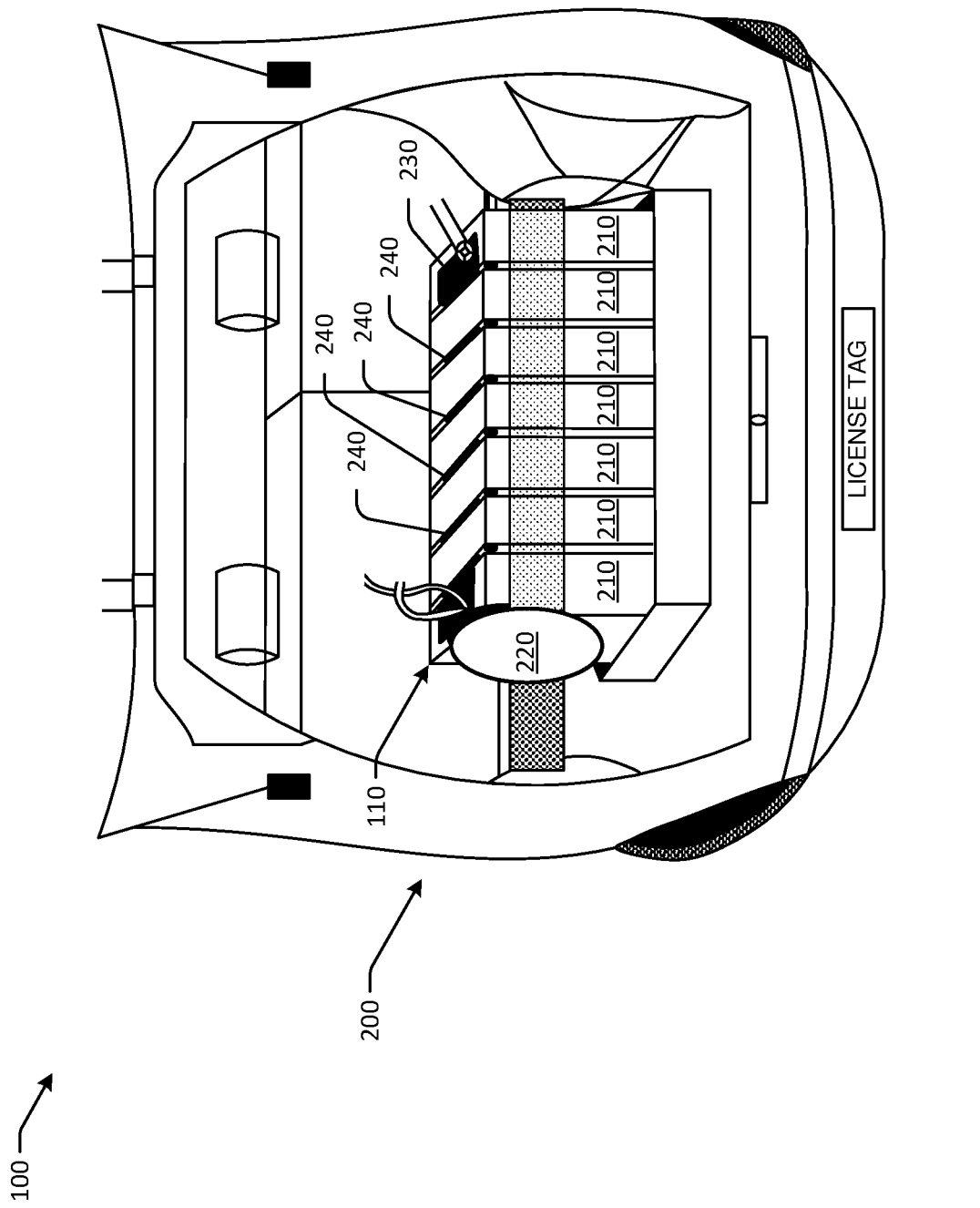
FIG. 2 schematically illustrates a removable homopolar generator positioned in an electric vehicle in accordance with one or more embodiments of the disclosure.

FIG. 2 schematically illustrates the removable homopolar generator 110 of FIG. 1 positioned in the electric vehicle 100 in accordance with one or more embodiments of the disclosure. In the example of FIG. 2, the homopolar generator 110 is positioned in a trunk space 200 of the electric vehicle 100 and is detachable or otherwise removable from the electric vehicle 100.

The homopolar generator 110 may include one or more components in a housing. For example, the homopolar generator 110 may include a number of frame elements 210 that may support one or more magnets aligned along a shaft of the homopolar generator 110. The frame elements 210 may be plastic frame elements positioned to support magnets and/or conductive element portions of the homopolar generator 110. The frame elements 210 may be rectangular or may have another geometry. A drive motor 220 may be used to cause the shaft of the homopolar generator 110 to rotate. One or more conductive discs may be mounted to the shaft and may rotate with the shaft. The conductive discs may generate a current in conjunction with the magnets positioned in a recessed portion of the respective frame elements 210. A copper component 230, or a semi-copper component or other conductive material (e.g., copper and carbon blend, etc.), may be used to transport current generated by the homopolar generator 110 to a power output component. The copper component 230 may extend along some of the exterior surfaces of the homopolar generator 110. A certain amount or volume of copper may be needed to transport the amount of current generated by the homopolar generator 110. Conductive plates 240 may be in communication with the copper components and may be used for the transport of current.

Figure 3:
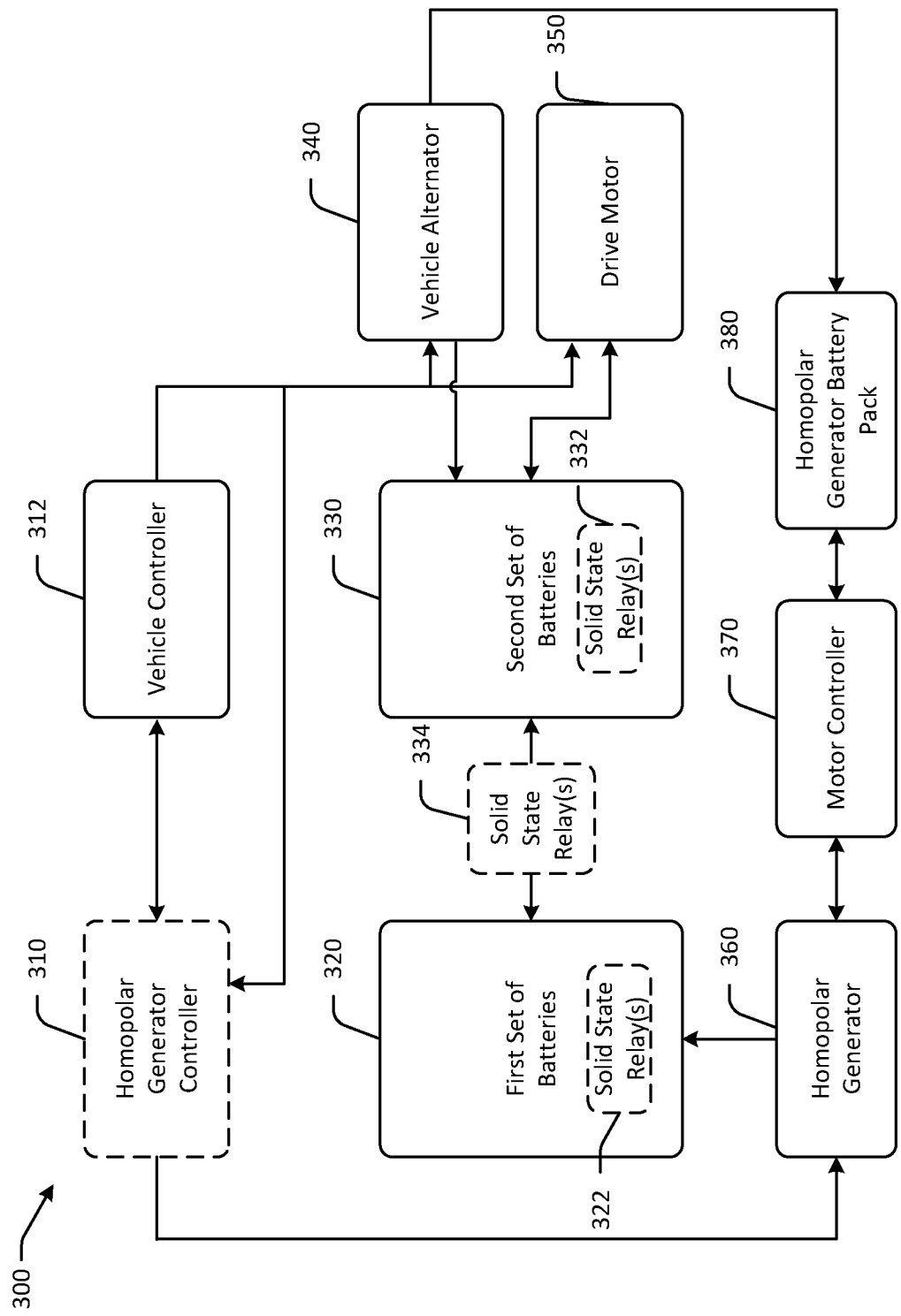
FIG. 3 schematically illustrates an electric vehicle control system and related hardware components in accordance with one or more embodiments of the disclosure.

FIG. 3 schematically illustrates an electric vehicle control system 300 and related hardware components in accordance with one or more embodiments of the disclosure. The electric vehicle control system 300 may include an optional homopolar generator controller 310 and a vehicle controller 312. In some embodiments, a single controller may be used. The homopolar generator controller 310 may be configured to manage operation of a homopolar generator 360, as well as to manage charging of one or more batteries connected to the homopolar generator 360. The vehicle controller 312 may be a default vehicle controller configured to manage one or more aspects of the electric vehicle, such as charging or discharging of the original battery set.

The electric vehicle control system 300 may include a first set of batteries 320 and a second set of batteries 330. The first set of batteries 320 and a second set of batteries 330 may be rechargeable batteries. The first set of batteries 320 and the second set of batteries 330 may be original batteries in that the batteries are part of the original manufacturer equipment, or may be aftermarket batteries. In some embodiments, the first set of batteries 320 may be aftermarket batteries or may be a part of the homopolar generator 360 or related system, and the second set of batteries 330 may be original equipment. In some embodiments, the rechargeable batteries may be lithium-ion (Li-ion) batteries. In other embodiments, the rechargeable batteries may be lithium-ion polymer (Li-ion polymer) batteries, nickel metal hydride (NiMH) batteries, nickel cadmium (NiCd) batteries, or the like. The rechargeable batteries may have an identical configuration, with the same nominal voltage and the same capacity. In some embodiments, the rechargeable batteries each may have a nominal voltage of 3.7V. In other embodiments, the batteries each may have a nominal voltage of 1.8V. Still other nominal voltages of the batteries may be used. Although the illustrated embodiment is shown as including two rechargeable batteries, the homopolar generator controller 310 may include any number of rechargeable batteries electrically connected to one another and configured to power the processor(s). In various embodiments, the homopolar generator controller 310 may include three, four, five, six, seven, eight, nine, ten, or more rechargeable batteries each having an identical configuration, with the same nominal voltage and the same capacity.

A first set of solid state relays 322 may be configured to dynamically adjust electrical connections between individual or groups of batteries in the first set of batteries 320 from parallel connections to series connections, or from series connections to parallel connections. As a result, any individual battery or group of batteries within the first set of batteries 320 may be charged or discharged, and charging time can be reduced by using parallel connections. Likewise, a second set of solid state relays 332 may be configured to dynamically adjust electrical connections between individual or groups of batteries in the second set of batteries 330 from parallel connections to series connections, or from series connections to parallel connections.

One or more solid state relay 334 may be electrically coupled between the plurality of rechargeable batteries, or the first set of batteries 320 and the second set of batteries 330. Specifically, a third set of solid state relays 334 may be configured to dynamically adjust electrical connections between the first set of batteries 320 and the second set of batteries 330 from parallel connections to series connections, or from series connections to parallel connections. As a result, each bank of batteries can be discharged or charged in parallel or series with respect to the other.

In particular, the one or more solid state relay(s) may be configured to transition between a first state in which the one or more solid state relay(s) form a series connection between the batteries in either or both the first set of batteries 320 and the second set of batteries 330, and a second state in which the one or more solid state relay(s) form a parallel connection between the batteries in either or both the first set of batteries 320 and the second set of batteries 330. In this manner, the one or more solid state relay(s) may facilitate power management of the rechargeable batteries during discharging and charging of the rechargeable batteries. In some embodiments, the one or more solid state relay(s) may include one or more metal-oxide-semiconductor field-effect transistor(s) (MOSFET(s)). In some embodiments, the one or more solid state relay(s) may include one or more enhancement-mode MOSFETs. Other types of solid state relay(s) may be used. The homopolar generator controller 310 may include any number of solid state relay(s) configured to selectively form a series connection between the rechargeable batteries and a parallel connection between the rechargeable batteries.

The electric vehicle control system 300 may include a vehicle alternator 340, a drive motor 350, and in some embodiments, other components such as a starter. The drive motor 350 may be controlled by the vehicle controller 312 and may be used to at least partially charge the second set of batteries 330. The first set of batteries 320 and/or the second set of batteries 330 may be configured to provide power to one or more components of the electric vehicle, such as a starter.

The vehicle alternator 340 may generate a current when the electric vehicle is in motion or is otherwise operational. The vehicle controller 312 may control operation of the vehicle alternator 340. The vehicle alternator 340 may output current to a homopolar generator battery pack 380. The homopolar generator battery pack 380 may store energy that is used to power the homopolar generator 360 during operation. The homopolar generator battery pack 380 may provide a steady and available source of power for the homopolar generator 360. The homopolar generator battery pack 380 may be in communication with a motor controller 370 and/or the homopolar generator 360, which can optionally be used to manage operation of the drive motor of the homopolar generator 360.

The homopolar generator controller 310 may be in communication with the vehicle controller 312 and may determine information such as vehicle load or usage, which in turn can be used to manage series or parallel connections of the first set of batteries 320 and the second set of batteries 330, as well as determining when to charge certain batteries and charging times. For example, under high load, the homopolar generator controller 310 may cause the first set of batteries 320 and the second set of batteries 330 to be in a series connection, thereby increasing available power. Under light load, the homopolar generator controller 310 may cause the first set of batteries 320 and the second set of batteries 330 to be in a parallel connection, thereby increasing driving range. The homopolar generator controller 310 may manage operation of one or more of the respective solid state relays to generate the respective series or parallel connections.

The homopolar generator controller 310 may be configured to cause the one or more solid state relays 334 to create a series connection between the first set of batteries 320 and the second set of batteries 330 during discharging, and to create a parallel connection between the first set of batteries 320 and the second set of batteries 330 during charging.

The homopolar generator controller 310 may be configured to match an output voltage of the homopolar generator 360 to a voltage level of at least one of the rechargeable batteries in the first set of batteries 320.

The homopolar generator 360 may include a power output component that may be coupled to the solid state relay 322 or directly to one or more batteries of the first set of batteries 320 in the example of FIG. 1. A voltage output of the homopolar generator 360 may substantially match a voltage level of a device connected to the power output component, such as the batteries being charged.

The homopolar generator controller 310 may be connected to the factory CAN system or the vehicle controller 320 to monitor parameters of the electric vehicle. The vehicle information may be used to make determinations by the homopolar generator controller 310. The homopolar generator controller 310 monitors the homopolar generator 360 input and output, motor load, and the state of charge on the first set of batteries 320 (e.g., 48 volts, etc.). The second set of batteries 330 may be maintained by the alternator 340 mated to the vehicle drive train. The main battery bank, or the second set of batteries 330 and its batteries state of charge are also monitored.

The first set of batteries 320 may include, in one example, 48 batteries grouped in twelve sets of four batteries. Each set may have a switch plate that can switch the batteries from 32 volts down to 4 volts. The cells may be charged at four volts. The switch plate then returns to its center position via an actuator. In the center position it may be in 32 volt mode. When in this position it may be paralleled to a 32 volt potential on the second set of batteries 330. This may be done every 32 volts across the entire series of batteries in the second set of batteries 330. This results in 12 sets of 4 batteries.

The result may be a system that can selectively charge the first set of batteries 320. Once paralleled to the second set of batteries 330 the difference in state of charge causes the current to flow from the charged battery to the depleted battery raising its voltage from 3.2 volts back to nominal voltage of 3.8 in one example. This can be done in sets, individually or all at once. The result may be the second set of batteries 330 may be charged to 90% charge in under 10 minutes. Collectively the discharge may be between 1200 to 1500 amps at 32 volts. Each pack would experience 130 amps or so decreasing over the ten minutes to around 30 amps. Discharges can be selectively electric vehicle out depending on the number of battery packs placed in series 1 through 12.

In FIG. 3, the homopolar generator 360 is supported by two sets of six batteries in the homopolar generator battery pack 380 that are not connected to the first set of batteries 320, creating an ability to switch between the 48 volt potentials. In some embodiments, the drive motor 350 can be directly connected to the alternator 340 bypassing the rectifier. This may be called overriding and may be a 5 Kw permanent magnet Alternator/BLDC motor.

The homopolar generator 360 generator may be configured to produce 1400 amps, thereby providing adequate amperage at 3.2 through 4 volts. Accordingly, 116 amps may be available for three sets of batteries. Recovery time may be dependent on state of charge. Once the needed state of charge may be reached the homopolar generator controller 310 may turn off or disengage the actuator allowing it to re-center to the series and connected to the second set of batteries 330 at a 36 volt parallel, or it can connect the other parallel on the pack. The batteries individually may be in a series parallel arrangement.

A switch plate may be used to connect to each parallel of the batteries individually at 4 volts without breaking the series of 8 volts in series. Batteries may be charged by charging halves of multiple packs for faster charging. The controller could choose to add packs as the amperage reduces over time. This would have the effect of regulating generator speed and amperage. Combining these capabilities allows for many charging and discharging algorithms.

In another embodiment, the amp hour on the second set of batteries 330 may be adjusted in or near real time. A fast charge time on the first set of batteries 320 can be used to dump a lot of energy in a short time, which increases efficiency when off the throttle in a deceleration mode and during braking.

When the electric vehicle is not in operation, the vehicle controller 312 may top off and balance the battery cells. Also, the wall power can step down and rectify voltage. This can be used to operate the homopolar generator controller 310, as well as provide power for the operation of the generator to recover the bank and bulk charge the second set of batteries 330.

In some embodiments, the homopolar generator 360 may operate as a drive motor if allowed to slow down below the batteries state of charge. If the RPMs are held at the state of charge, it neither charges nor drives. The direction of rotation may remain constant with either function. This could be used to assist in motion or in a standalone system to operate a water pump for example. Another note may be that the charge speed and drive speed may be within 1000 RPMs. Designs could include designing the homopolar generator 360 or motor on a common shaft, thereby providing the conventional drive and the other provides regeneration capability.

In an illustrative configuration, the homopolar generator controller 310 may include one or more processors (processor(s)), one or more memory devices (also referred to herein as memory), one or more input/output (I/O) interface(s), one or more network interface(s), one or more antenna€, one or more transceiver(s), and/or data storage. The homopolar generator controller 310 may further include one or more bus(es) that functionally couple various components of the homopolar generator controller 310. These various components will be described in more detail hereinafter.

The bus(es) may include at least one of a system bus, a memory bus, an address bus, or a message bus, and may permit the exchange of information (e.g., data (including computer-executable code), signaling, etc.) between various components of the homopolar generator controller 310. The bus(es) may include, without limitation, a memory bus or a memory controller, a peripheral bus, an accelerated graphics port, and so forth. The bus(es) may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory of the homopolar generator controller 310 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage may include removable storage and/or non-removable storage including, but not limited to, magnetic storage, optical disk storage, and/or tape storage. The data storage may provide non-volatile storage of computer-executable instructions and other data. The memory and the data storage, removable and/or non-removable, are examples of computer-readable storage media (CRSM) as that term is used herein.

The data storage may store computer-executable code, instructions, or the like that may be loadable into the memory and executable by the processor(s) to cause the processor(s) to perform or initiate various operations described herein. The data storage may additionally store data that may be copied to the memory for use by the processor(s) during the execution of the computer-executable instructions. Moreover, output data generated as a result of execution of the computer-executable instructions by the processor(s) may be stored initially in the memory, and may ultimately be copied to data storage for non-volatile storage.

More specifically, the data storage may store one or more operating systems (O/S); one or more database management systems (DBMS); and one or more program module(s), applications, engines, computer-executable code, scripts, or the like such as, for example, one or more communication module(s) and/or one or more power management module(s). Some or all of these module(s) may be or include sub-module(s). Any of the components depicted as being stored in data storage may include any combination of software, firmware, and/or hardware. The software and/or firmware may include computer-executable code, instructions, or the like that may be loaded into the memory for execution by one or more of the processor(s). Any of the components depicted as being stored in data storage may support the functionality described in reference to the corresponding components named in this disclosure.

The data storage may further store various types of data utilized by the components of the homopolar generator controller 310. Any data stored in the data storage may be loaded into the memory for use by the processor(s) in executing computer-executable code. In addition, any data depicted as being stored in the data storage may potentially be stored in one or more datastore(s) and may be accessed via the DBMS and loaded in the memory for use by the processor(s) in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) may be configured to access the memory and execute computer-executable instructions loaded therein. For example, the processor(s) may be configured to execute computer-executable instructions of the various program module(s), applications, engines, or the like of the homopolar generator controller 310 to cause or facilitate various operations to be performed in accordance with one or more embodiments of the disclosure. The processor(s) may include any suitable processing unit capable of accepting data as input, processing the input data in accordance with stored computer-executable instructions, and generating output data. The processor(s) may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) may be capable of supporting any of a variety of instruction sets.

The homopolar generator controller 310 may include computer-executable instructions, code, or the like that responsive to execution by one or more of the processor(s) may perform functions including, but not limited to, determining a voltage of a rechargeable battery of the homopolar generator controller 310, causing one or more solid state relays of the homopolar generator controller 310 to form a series connection or a parallel connection between a first rechargeable battery and a second rechargeable battery, causing a first rechargeable battery and a second rechargeable battery of the homopolar generator controller 310 to power the electric vehicle, determining that the homopolar generator controller 310 is connected to an external power source, causing a first rechargeable battery and a second rechargeable battery of the homopolar generator controller 310 to be charged by an external power source, and the like.

In addition, various program module(s), script(s), plug-in(s), Application Programming Interface(s) (API(s)), or any other suitable computer-executable code hosted locally on the homopolar generator controller 310, and/or hosted on other computing device(s) accessible via one or more networks, may be provided to support the functionality provided by the program module(s), applications, or computer-executable code depicted in FIG. 3 and/or additional or alternate functionality. Further, functionality may be modularized differently such that processing described as being supported collectively by the collection of program module(s) depicted in FIG. 3 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 3 may be implemented, at least partially, in hardware and/or firmware.

It should further be appreciated that the homopolar generator controller 310 may include alternate and/or additional hardware, software, or firmware components beyond those described or depicted without departing from the scope of the disclosure. More particularly, it should be appreciated that software, firmware, or hardware components depicted as forming part of the homopolar generator controller 310 are merely illustrative and that some components may not be present or additional components may be provided in various embodiments. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Figure 4:
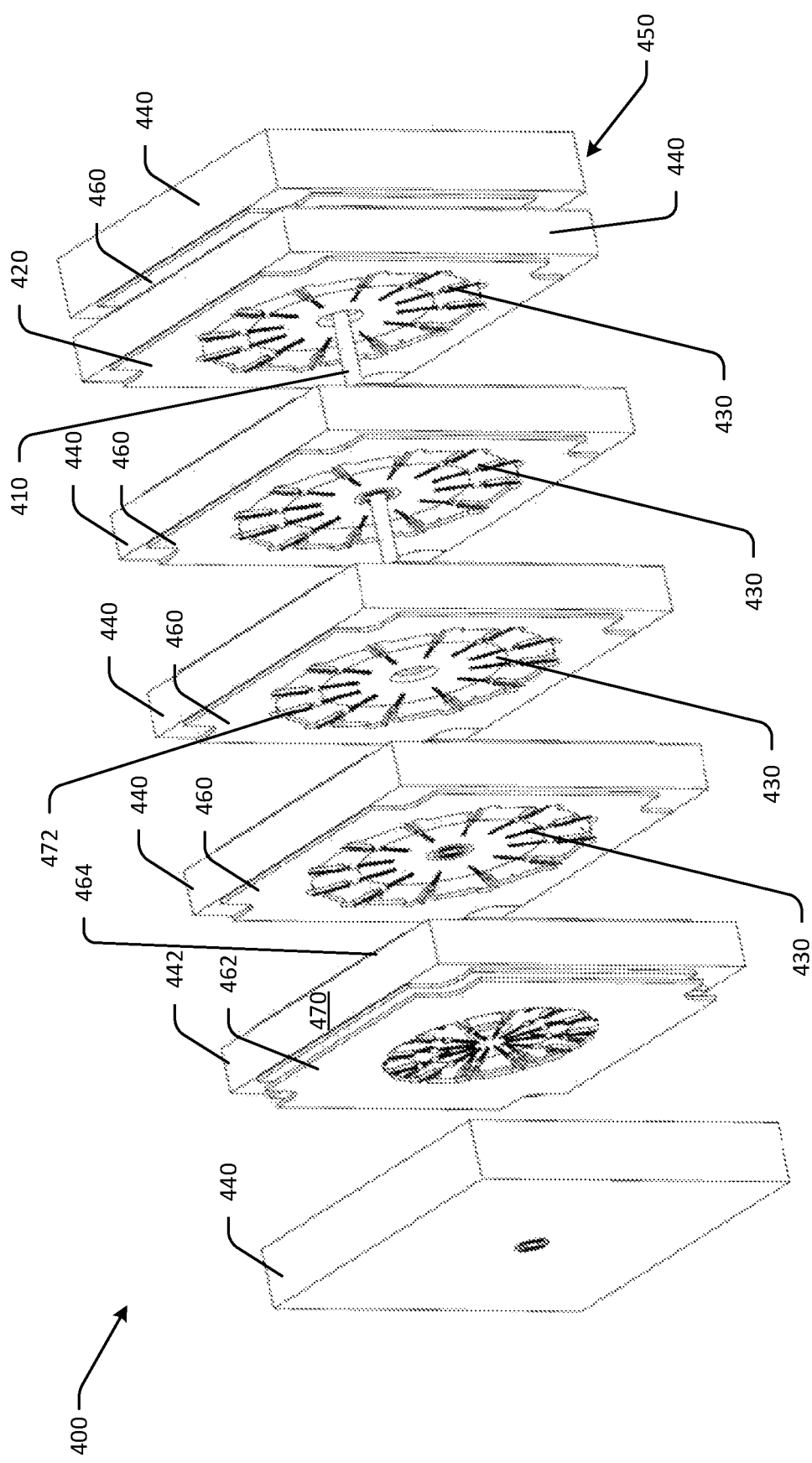
FIG. 4 schematically illustrates a homopolar generator in an exploded view in accordance with one or more embodiments of the disclosure.

FIG. 4 schematically illustrates a homopolar generator 400 in an exploded view in accordance with one or more embodiments of the disclosure. The homopolar generator 400 may include a drive motor, a shaft 410, and one or more copper discs 420 mounted on the shaft 410. The drive motor may be configured to impart motion to the shaft 410 to rotate the copper discs 420. The drive motor may be powered by one or more batteries, such as a battery pack that is charged by an alternator or other component of the vehicle. The shaft 410 may be powered or rotated by an axle, shaft, drive motor, or other mechanical component of the electric vehicle in some embodiments. The homopolar generator 400 may include a set of magnets 430 that may be mounted in a fixed position about either side of the copper disc 420. The homopolar generator 400 may be positioned in a housing and may be removable from an electric vehicle and may be portable.

The homopolar generator 400 may include a number of frame elements 440. The frame elements 440 may form a housing 450 of the homopolar generator 400. The shaft 410 may extend through the frame elements 440. For example, the shaft 410 may extend through a center of one or more of the frame elements 440.

The copper discs 420 may be positioned adjacent to one or more copper plates 460 that may be mounted on one or more sides of the frame elements 440. For example, a first copper plate 462 may be mounted to a first side of a first frame element 442. A second copper plate 464 may be mounted to a second side of the first frame element 442. A copper linkage component 470 may be in contact with the first copper plate 462 and the second copper plate 464, and may be disposed about a third side of the first frame element 442 that is transverse to the first side and the second side. The copper discs 420 and/or copper plates 460 may be formed of a copper material, carbon material, a combination thereof, or another material.

The magnets 430 may be positioned in the frame elements 440 (e.g., in a recessed portion of the frame elements, etc.) and may be positioned about or adjacent to the copper discs 420. The magnets 430 may be in a fixed position with respect to the shaft 410, or the copper discs 420 may be in a fixed position.

The homopolar generator 400 may include a first set of conductive brushes 470 mounted to the first copper plate 462. The first set of conductive brushes 470 may be in electrical communication with a first copper disc 422 of the copper discs 420. A second set of conductive brushes 472 may be mounted to the second copper plate 464. The second set of conductive brushes 472 may be in electrical communication with a second copper disc 424 of the copper discs 420.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Processes and Use Cases

Figure 5:
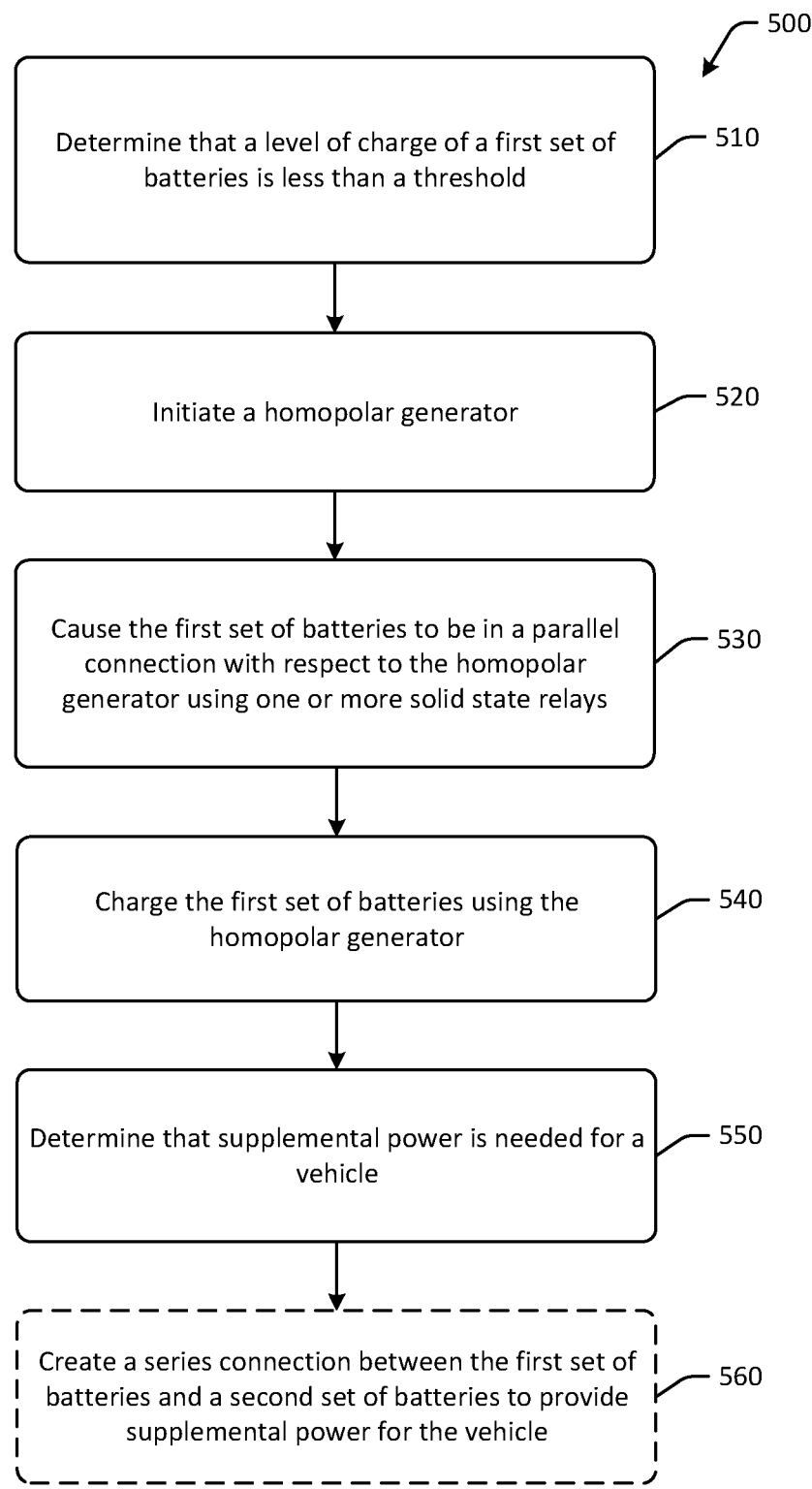
FIG. 5 is an example process flow diagram for intelligent circuit control for solar panel systems having multiple rechargeable batteries in accordance with one or more embodiments of the disclosure.

FIG. 5 is an example process flow 500 for intelligent circuit control for solar panel systems having multiple rechargeable batteries in accordance with one or more embodiments of the disclosure. Although certain operations are illustrated as occurring separately in FIG. 5, some or all of the operations may occur concurrently or partially concurrently. In some embodiments, the operations of the process flow 500 may be executed by one or more processor(s), such as processor(s) of the homopolar generator controller 310.

At block 510 of the process flow 500, it may be determined that a level of charge of a first set of batteries is less than a threshold. For example, computer-executable instructions of a homopolar generator controller or other processor may be executed to determine a charge level of individual batteries in a first set of batteries, or an aggregate or average charge level of the first set of batteries. The first set of batteries may be an aftermarket set of batteries, an original set of batteries, of a combination thereof. The threshold may be specific to the first set of batteries as an absolute threshold (e.g., 20% average charge level, etc.), or may be dependent upon charge levels of other batteries in communication with the first set of batteries, such as a second set of batteries. The threshold may change as a function of, or in relation to, a vehicle load, an expected driving distance, or other factors.

At block 520 of the process flow 500, a homopolar generator may be initiated. For example, computer-executable instructions of a homopolar generator controller or other processor may be executed to power on a homopolar generator. The homopolar generator may be powered by a dedicated power supply, such as a battery pack or mechanical power provided by a vehicle.

At block 530 of the process flow 500, the first set of batteries may be caused to be in a parallel connection with respect to the homopolar generator using one or more solid state relays. For example, computer-executable instructions of a homopolar generator controller or other processor may be executed to adjust one or more solid state relays to create a parallel connection between batteries in the first set of batteries and the homopolar generator, such that the batteries are charged in parallel.

At block 540 of the process flow 500, the first set of batteries may be charged using the homopolar generator. Power generated by the homopolar generator may be output to individual batteries of the first set of batteries. The current provided from the homopolar generator may flow through one or more relays, mosfets, or other electrical components to the batteries.

At block 550 of the process flow 500, it may be determined that supplemental power is needed for a vehicle. For example, computer-executable instructions of a homopolar generator controller or other processor may be executed to communicate with a vehicle controller (in embodiments where the homopolar generator controller and vehicle controller are separate and not integrated) to determine a current vehicle load. For example, strain on the electric motors, auxiliary equipment usage, speed, and other factors may be used to determine a vehicle load. The vehicle load may be used to determine an expected amount of power needed to support the load. Based at least in part on the expected amount of power needed and a current level of battery power available, the homopolar generator controller may determine that supplemental power is needed, or that a charge level of the set of batteries is to be increased.

At optional block 560 of the process flow 500, a series connection may be created between the first set of batteries and a second set of batteries to provide supplemental power for the vehicle. For example, computer-executable instructions of a homopolar generator controller or other processor may be executed to adjust one or more solid state relays to create a series connection between the first set of batteries and a second set of batteries (which may be original batteries in the vehicle) and the homopolar generator, such that the batteries are discharged in series and power is increased.

Figure 6:
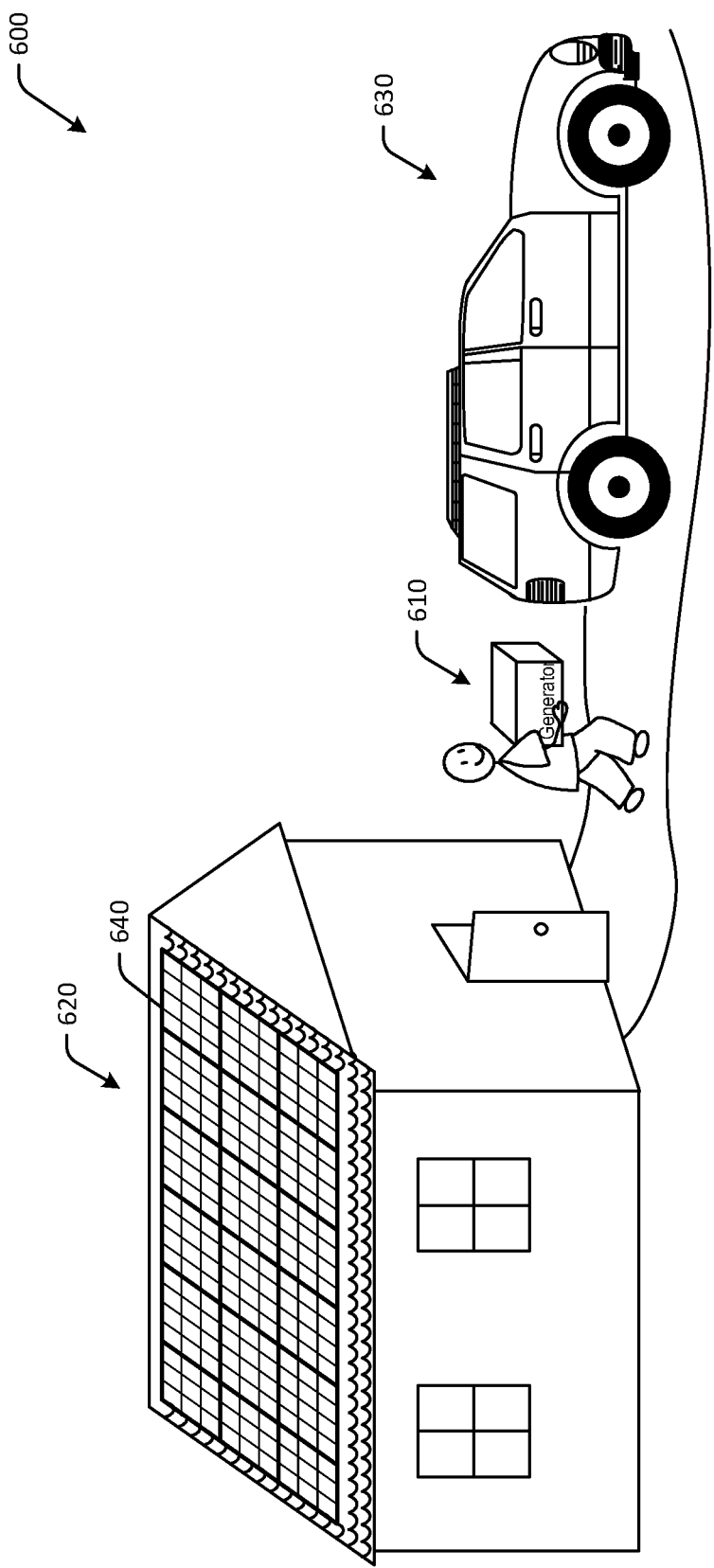
FIG. 6 illustrates an example use case of a removable homopolar generator in accordance with one or more embodiments of the disclosure.
Figure 7:
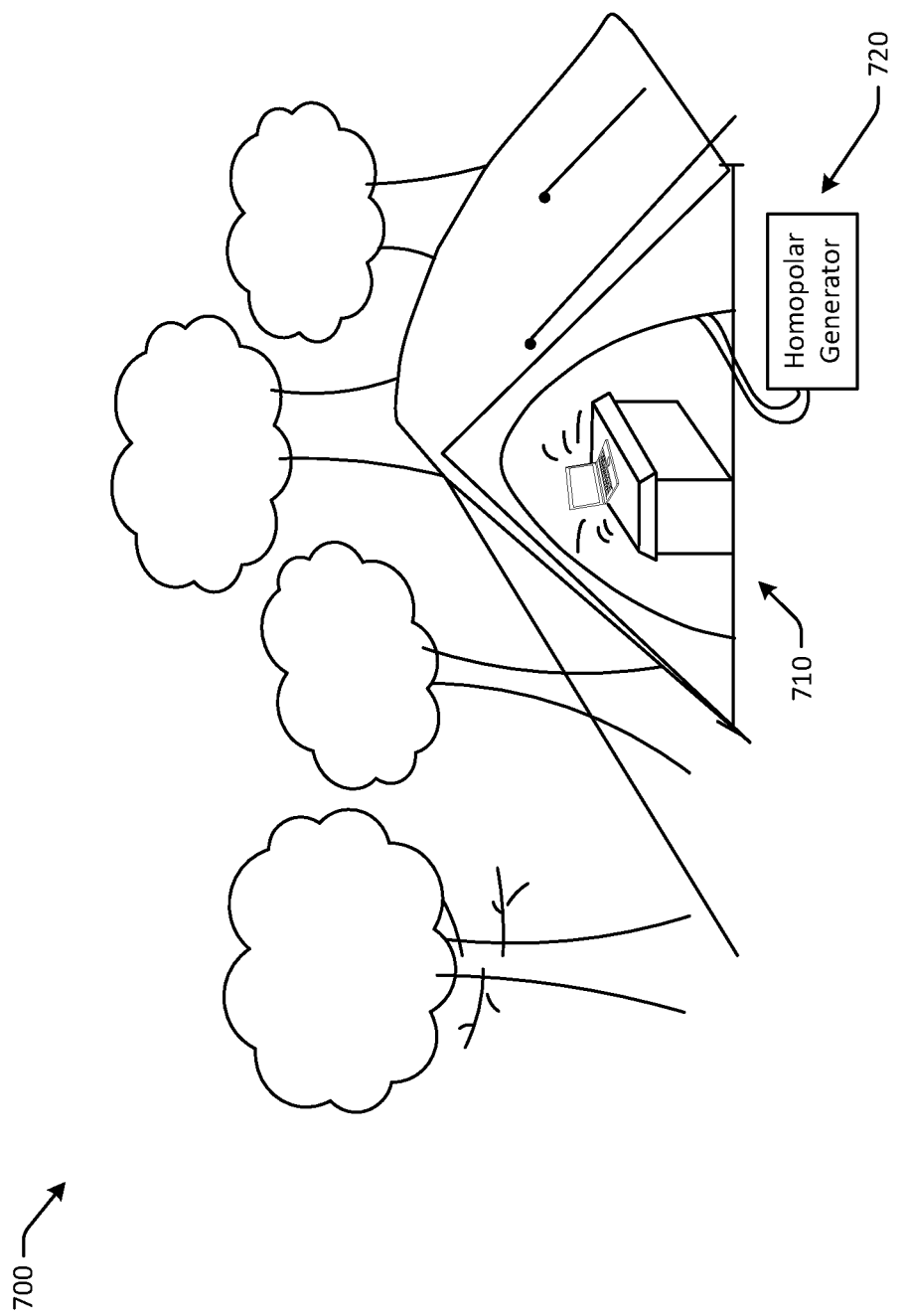
FIG. 7 illustrates an example use case of a removable homopolar generator in accordance with one or more embodiments of the disclosure.
Figure 8:
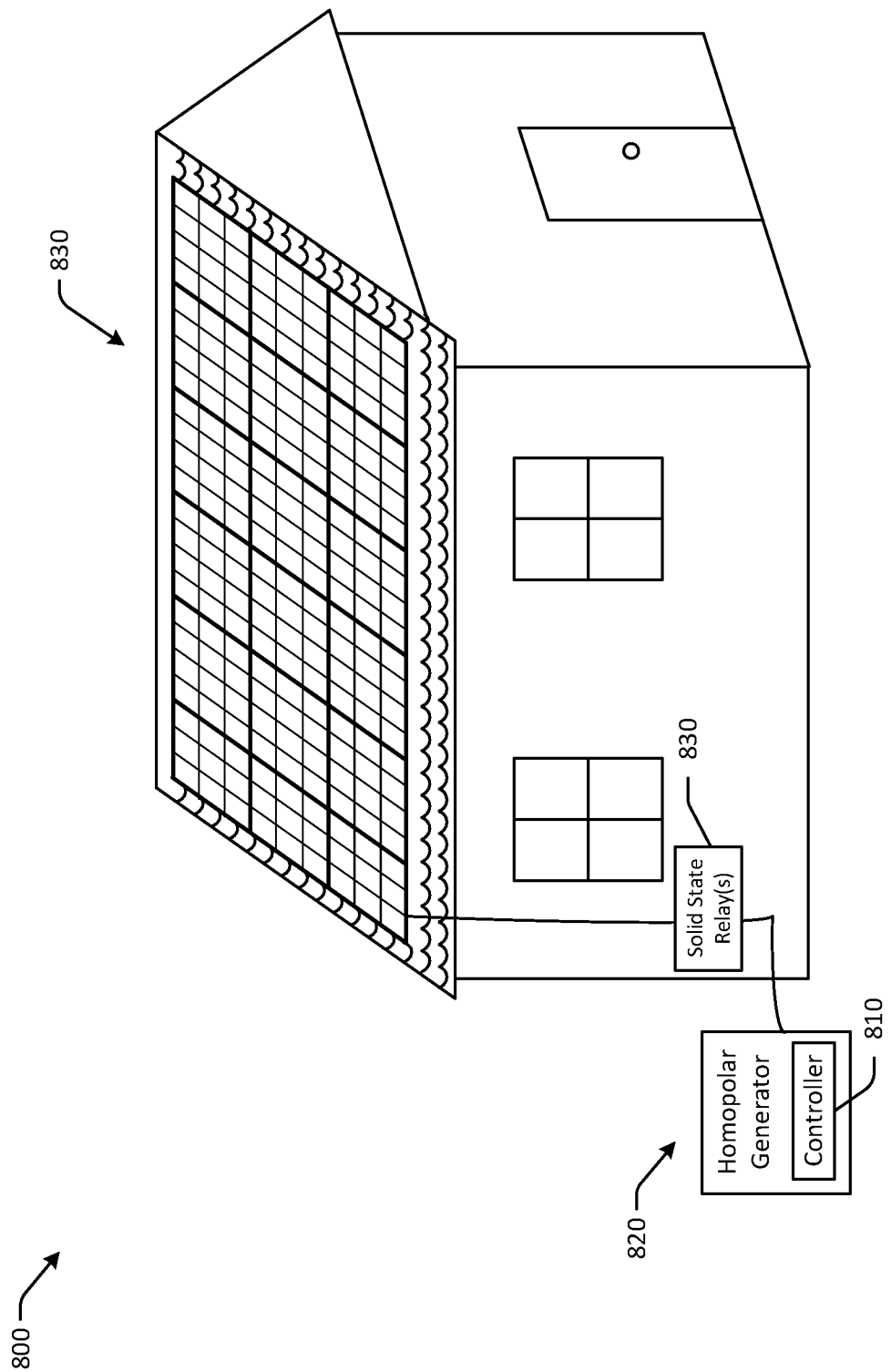
FIG. 8 illustrates an example use case of a removable homopolar generator in accordance with one or more embodiments of the disclosure.

FIGS. 6-8 illustrate example use cases of a removable homopolar generator in accordance with one or more embodiments of the disclosure. In FIG. 6, an example use case 600 is illustrated with a homopolar generator 610 that is positioned in a modular housing that is removable from an electric vehicle 630. The homopolar generator 610 may be removed from the electric vehicle 630 and can be taken indoors 620, such as into a house, to provide energy or power to devices in the house. The homopolar generator 610 may be powered, in one example, by one or more solar panels 640. In some embodiments, the homopolar generator 610 may include its own battery pack or power supply.

In FIG. 7, an example use case 700 of a removable homopolar generator 720 is depicted in accordance with one or more embodiments of the disclosure. The homopolar generator 720 may be removed from an electric vehicle and taken to a camping environment 710, where it can be used to power devices or recharge batteries in a short amount of time.

In another example use case 800 illustrated in FIG. 8, a homopolar generator 820 may include a homopolar generator controller 810 and may be electrically coupled to one or more solar panels 830. One or more solid state relays 840 may be positioned in between the solar panels 830 and the homopolar generator 820. The homopolar generator controller 810 may be used to connect certain solar panels to the homopolar generator 820, so as to selectively draw power from solar panels using the solid state relay 830.

The homopolar generator controller 810 may therefore be configured to manage power provided by the rechargeable batteries to the vehicle by selectively changing a connection between the rechargeable batteries based at least in part on a particular application to be run on the homopolar generator controller 310.

Embodiments of the disclosure may therefore increase driving distances for electric vehicles by providing additional battery capacity, decrease battery charging times by charging batteries in parallel, increase available power, and provide auxiliary power to vehicle components or users.

Figure 9:
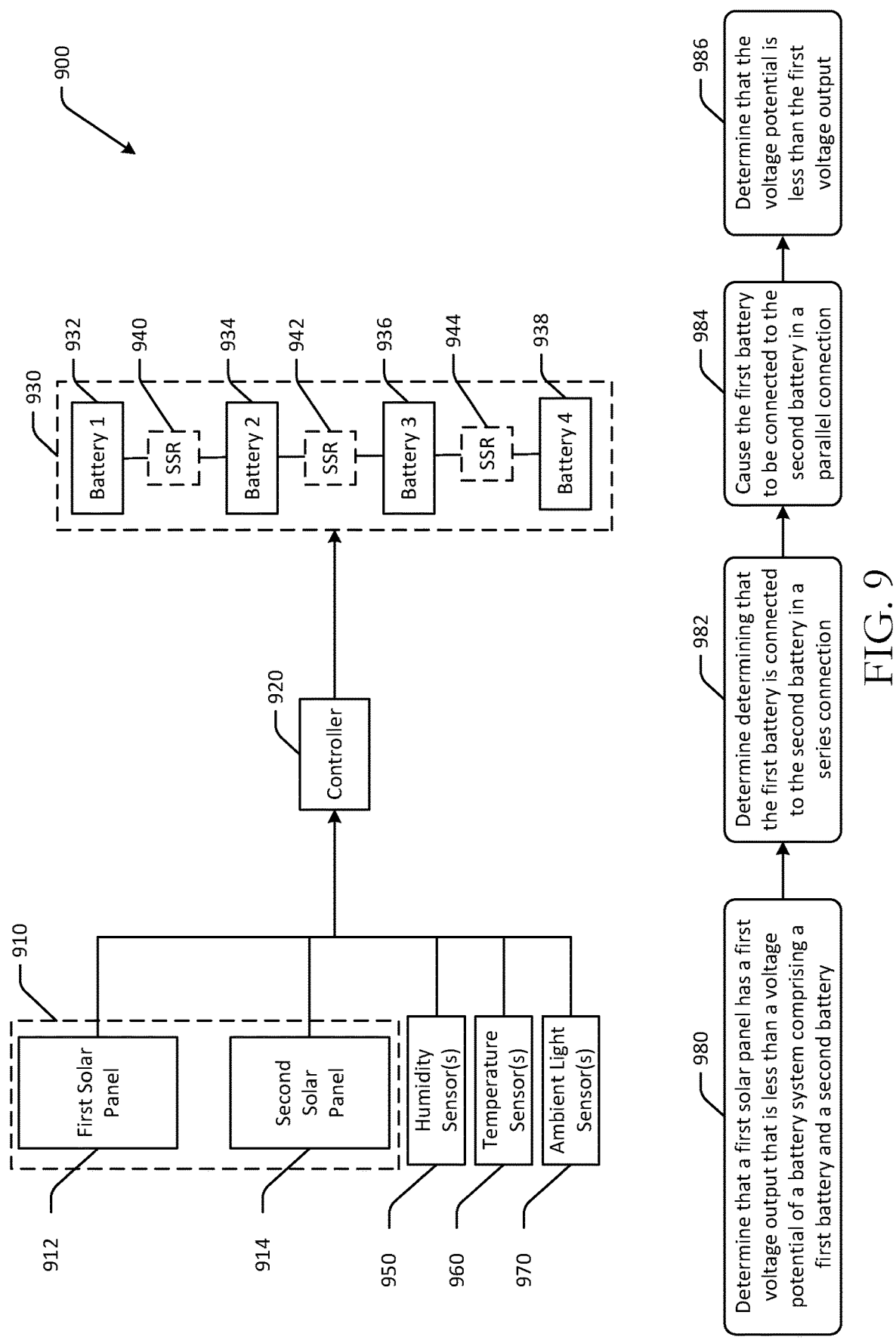
FIG. 9 illustrates an example use case of an intelligent circuit control for solar panel systems in accordance with one or more embodiments of the disclosure.

FIG. 9 schematically illustrates an example use case 900 of intelligent circuit control for solar panel systems in accordance with one or more embodiments of the disclosure. In the example of FIG. 9, a solar panel system may be used to charge or recharge one or more batteries. Using the technology discussed in this application, the solar panel system efficiency may be increased with respect to energy generated by the solar panel system that is captured by one or more batteries. This is because a voltage potential of the one or more batteries, or the voltage potential of a battery system, may be modified to be equal to or less than a voltage output by the solar panel system. This is in contrast to systems where a battery system voltage may be unchangeable, and although the solar panel system is producing electrical output, the electrical output may not be captured because the battery system voltage potential is greater than the output, making electrical flow difficult or impossible. As a result, efficiency may be reduced. In contrast, the systems described herein can adjust a voltage potential of the battery system so as to be equal to or less than the electrical output, thereby increasing the electrical output captured from the solar panel system. Voltage potential may be adjusted by connecting batteries in various series or parallel connections, and/or by connecting or disconnecting certain batteries.

In FIG. 9, a solar panel system 910 may include a first solar panel 912 and a second solar panel 914. The solar panels may include photovoltaic cells and may be configured to output electrical current. The solar panel system 910 may be coupled to a controller 920 configured to control operation of the solar panel system 910 and/or detect an output of the solar panel system 910. The controller 920 may be coupled to a battery system 930. In some embodiments, the battery system 930 may be a part of the solar panel system 910.

The battery system 930 may include a plurality of rechargeable batteries and one or more optional solid state relays or mosfets configured to connect respective batteries of the plurality of rechargeable batteries in either a series connection or a parallel connection. For example, the battery system 930 may include a first battery 932, a second battery 934, a third battery 936, a fourth battery 940, and/or additional or fewer batteries.

One or more optional solid state relays or other transistors may be configured to create series or parallel connections between respective batteries. For example, a first solid state relay 940 may be configured to create a series or parallel connection between the first battery 932 and the second battery 934, a second solid state relay 942 may be configured to create a series or parallel connection between the second battery 934 and the third battery 936, a third solid state relay

944 may be configured to create a series or parallel connection between the third battery 936 and the fourth battery 938, and so forth. Other configurations may be included, such as a solid state relay between three or more batteries, and the like.

The controller 920 may be configured to substantially match an output voltage of the solar panel system 910, such as the output voltage of the first solar panel 912 and the second solar panel 914, to a voltage potential of the plurality of rechargeable batteries, or the battery system 930. For example, the controller 920 may be configured to execute operations such as determining a first electrical output of the first solar panel, and determining a second electrical output of the second solar panel. The controller 920 may determine a total output voltage using the first electrical output and the second electrical output, and cause a connection between the plurality of rechargeable batteries to be changed from a series connection to a parallel connection based at least in part on the total output voltage, such that a voltage potential of the plurality of rechargeable batteries or battery system 930 is equal to or less than the total output voltage. In some embodiments, the first electrical output and the second electrical output may be determined as output currents.

The controller 920 may continuously or periodically monitor the electrical output of the solar panel system 910. For example, the controller 920 may be configured to determine that the total output voltage of the solar panel system 910 has decreased from a first value to a second value (e.g., because of rain or shadows, etc.) and may therefore cause the voltage potential of the plurality of rechargeable batteries or battery system 930 to be modified to a value equal to or less than the second value. The modification may be the result of changes implemented by the one or more solid state relays or mosfets.

If the controller 920 determines that the first electrical output is greater than the second electrical output, the controller may cause the second solar panel 914 to be disconnected from the plurality of rechargeable batteries or battery 930, so that the first solar panel 912 is directly feeding power to one or more of the batteries at a relatively higher voltage and/or current.

In some embodiments, the system may include additional sensors. For example, the controller 920 may be optionally coupled to one or more humidity sensors 950, one or more temperature sensors 960, and/or one or more ambient light sensors 970. The sensor outputs may be used by the controller 920 to change one or more configurations of the battery system 930 and/or solar panel system 910. For example, the controller 920 may determine a first ambient light level using a first ambient light sensor adjacent to or physically near the first solar panel 912, and may determine a second ambient light level using a second ambient light sensor adjacent to or physically near the second solar panel 914. The controller 920 may determine that the second ambient light level is greater than the first ambient light level, and may cause the first solar panel 912 to be disconnected from the plurality of rechargeable batteries or battery system 930.

The controller 920 may be configured to determine a temperature of the first solar panel 912, for example by using a temperature sensor 960. If the controller 920 determines that the temperature meets or exceeds a cooling threshold, the controller 920 may cause a cooling system to cool the first solar panel 912. The cooling system may be a fluid-based heat rejection system, such as a water cooling system. The cooling threshold may be a temperature at or above which electrical output of the solar panel may be negatively impacted, such as about 110 degrees Fahrenheit.

If the controller 920 determines that the temperature is equal to or less than a heating threshold, the controller 920 may cause a heating system to heat the first solar panel. The heating system may be a fluid-based heating system, such as a liquid heating system, or may include one or more heating elements. The heating threshold may be a temperature at or below which electrical output of the solar panel may be negatively impacted, such as about 5 degrees Fahrenheit.

In some embodiments, the controller may be configured to determine an ambient temperature, ambient humidity level, and/or a moisture level or wetness of the first solar panel 912 or the solar panel system 910, and may cause one or more modifications to connections between the plurality of rechargeable batteries or battery system 930 based at least in part on the ambient temperature, the ambient humidity level, and/or the moisture level.

In some embodiments, the controller 920 may be configured to determine inputs of individual battery voltages of the set of batteries, states of charge of the set of batteries, battery temperatures, battery voltages, current output from the power source, ambient temperature, ambient humidity, and/or a combination thereof. The controller 920 may be configured to change the configuration between the respective batteries based at least in part on the inputs. Changes in the configuration of the set of batteries may cause a change in a total voltage potential of the set of batteries 930. In some instances, the controller 920 may be configured to change the configuration of the set of batteries to a combined configuration including both series and parallel connections. The controller 920 may be configured to dynamically match the voltage potential of the battery system to the output voltage or output current of the solar panel system 910. Temperature and humidity may be used to change charging voltages and/or current flow. For example, higher ambient temperatures or battery system temperatures may result in reduced charging voltages and/or current flow, whereas lower ambient temperatures and/or battery system temperatures may result in increased charging voltages and/or current flow. In addition, humidity values may be used to determine voltages or current flow. For example, higher humidity may result in increased charging voltages and/or current flow because materials may be more conductive, or vice versa.

In the example process flow of FIG. 9, at block 980, the controller 920 may determine that the first solar panel 912 has a first voltage output that is less than a voltage potential of the battery system 930. At block 982, the controller may determine that the first battery 932 is connected to the second battery 934 in a series connection, for example by determining a status of the first solid state relay 940. At block 984, the controller 920 may cause the first battery 932 to be connected to the second battery 934 in a parallel connection, for example, by changing a status of the first solid state relay 940. At block 986, the controller 920 may determine that the voltage potential is less than the first voltage output. The controller 920 may therefore dynamically match the voltage potential of the battery system 930 to the first voltage output of the solar panel system 910.

In some embodiments, a charging system may include a plurality of solar panels, a set of batteries that is charged by the plurality of solar panels, one or more switches or mosfets configured to create series or parallel connections between individual batteries of the set of batteries, and a controller. The controller may be configured to determine that a first solar panel is active, determine a voltage output of the first solar panel, determine that a voltage potential of the set of batteries is greater than the voltage output, and cause the voltage potential to be reduced to a value equal to or less than the voltage output.

The operations described and depicted in the illustrative methods, process flows, and use cases of FIGS. 1-9 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-9 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment. The term "based at least in part on" and "based on" are synonymous terms which may be used interchangeably herein.

That which is claimed is:

1. A system comprising:
    a first rechargeable battery;
    a second rechargeable battery, wherein the first rechargeable battery and the second rechargeable battery are configured to be connected in a series connection and a parallel connection;
    a first solar panel coupled to the first rechargeable battery and the second rechargeable battery;
    a second solar panel coupled to the first rechargeable battery and the second rechargeable battery; and
    a controller configured to:
        determine a combined voltage potential of the first rechargeable battery and the second rechargeable battery at a first timestamp;
        determine a sum of a first electrical output voltage of the first solar panel and a second electrical output voltage of the second solar panel at the first timestamp;
        determine that the combined voltage potential is greater than the sum at the first timestamp; and
        configure a connection between the first rechargeable battery and the second rechargeable battery based at least in part on the first electrical output voltage and the second electrical output voltage, such that the combined voltage potential of the first rechargeable battery and the second rechargeable battery is equal to or less than at least one of the first electrical output voltage and the second electrical output voltage.

2. The system of claim 1, wherein the controller is further configured to:
    determine that the first electrical output voltage of the first solar panel is greater than the second electrical output voltage of the second solar panel; and
    cause the second solar panel to be disconnected from the first rechargeable battery and the second rechargeable battery.

3. The system of claim 2, wherein the controller is configured to configure the connection by:
    causing the connection between the first rechargeable battery and the second rechargeable battery to be changed from a series connection to a parallel connection based at least in part on the first electrical output voltage, such that the combined voltage potential of the first rechargeable battery and the second rechargeable battery is equal to or less than the first electrical output voltage.

4. The system of claim 1, wherein the controller is further configured to:
    determine a combined voltage potential of the first rechargeable battery and the second rechargeable battery at a second timestamp;
    determine a sum of a first electrical output voltage of the first solar panel and a second electrical output voltage of the second solar panel at the second timestamp;
    determine that the combined voltage potential is greater than the sum at the second timestamp;
    determine that the second electrical output voltage is greater than the first electrical output voltage at the second timestamp; and
    cause the first solar panel to be disconnected from the first rechargeable battery and the second rechargeable battery.

5. The system of claim 4, wherein the controller is further configured to:
    causing the connection between the first rechargeable battery and the second rechargeable battery to be changed from a series connection to a parallel connection based at least in part on the second electrical output voltage, such that the combined voltage potential of the first rechargeable battery and the second rechargeable battery is equal to or less than the second electrical output voltage.

6. The system of claim 1, wherein the controller is further configured to:
    determine, at a second timestamp, that the combined voltage potential of the first rechargeable battery and the second rechargeable battery is greater than the first electrical output;
    cause the second solar panel to be reconnected to the first rechargeable battery and the second rechargeable battery; and
    cause the connection between the first rechargeable battery and the second rechargeable battery to be changed from the parallel connection to the series connection.

7. The system of claim 1, wherein the controller is further configured to:
    periodically determine updated values of the first electrical output of the first solar panel and the second electrical output of the second solar panel.

8. The system of claim 1, wherein the controller is further configured to:
    cause the second solar panel to be reconnected to the first rechargeable battery and the second rechargeable battery after a time interval has elapsed.

9. The system of claim 1, wherein the controller is further configured to:
- determine at least one of an ambient temperature or an ambient humidity level;
- wherein the connection between the first rechargeable battery and the second rechargeable battery is caused to be changed from the series connection to the parallel connection based at least in part on the at least one of the ambient temperature or the ambient humidity level.

10. The system of claim 1, wherein the controller is further configured to:
- determine that the sum has decreased from a first value to a second value; and
- cause the voltage potential of the first rechargeable battery and the second rechargeable battery to be modified to a value equal to or less than the second value.

11. The system of claim 1, wherein the controller is further configured to:
- determine a first ambient light level using a first ambient light sensor;
- determine a second ambient light level using a second ambient light sensor;
- determine that the second ambient light level is greater than the first ambient light level;
- cause the second solar panel to be reconnected to the first rechargeable battery and the second rechargeable battery; and
- cause the first solar panel to be disconnected from the first rechargeable battery and the second rechargeable battery.

12. A method comprising:
- determining, by a controller, a combined voltage potential of a first rechargeable battery and a second rechargeable battery at a first timestamp;
- determining a sum of a first electrical output voltage of a first solar panel and a second electrical output voltage of a second solar panel at the first timestamp;
- determining that the combined voltage potential is greater than the sum at the first timestamp; and
- configuring a connection between the first rechargeable battery and the second rechargeable battery based at least in part on the first electrical output voltage and the second electrical output voltage, such that the combined voltage potential of the first rechargeable battery and the second rechargeable battery is equal to or less than at least one of the first electrical output voltage and the second electrical output voltage.

13. The method of claim 12, further comprising:
- determining that the first electrical output voltage of the first solar panel is greater than the second electrical output voltage of the second solar panel; and
- causing the second solar panel to be disconnected from the first rechargeable battery and the second rechargeable battery.

14. The method of claim 13, wherein configuring the connection comprises:
- causing the connection between the first rechargeable battery and the second rechargeable battery to be changed from a series connection to a parallel connection based at least in part on the first electrical output voltage, such that the combined voltage potential of the first rechargeable battery and the second rechargeable battery is equal to or less than the first electrical output voltage.

15. The method of claim 12, further comprising:
- determining a combined voltage potential of the first rechargeable battery and the second rechargeable battery at a second timestamp;
- determining a sum of a first electrical output voltage of the first solar panel and a second electrical output voltage of the second solar panel at the second timestamp;
- determining that the combined voltage potential is greater than the sum at the second timestamp;
- determining that the second electrical output voltage is greater than the first electrical output voltage at the second timestamp; and
- causing the first solar panel to be disconnected from the first rechargeable battery and the second rechargeable battery.

16. The method of claim 15, further comprising:
- causing the connection between the first rechargeable battery and the second rechargeable battery to be changed from a series connection to a parallel connection based at least in part on the second electrical output voltage, such that the combined voltage potential of the first rechargeable battery and the second rechargeable battery is equal to or less than the second electrical output voltage.

17. The method of claim 12, further comprising:
- determining, at a second timestamp, that the combined voltage potential of the first rechargeable battery and the second rechargeable battery is greater than the first electrical output;
- causing the second solar panel to be reconnected to the first rechargeable battery and the second rechargeable battery; and
- causing the connection between the first rechargeable battery and the second rechargeable battery to be changed from the parallel connection to the series connection.

18. The method of claim 12, further comprising:
- determining a first ambient light level using a first ambient light sensor;
- determining a second ambient light level using a second ambient light sensor;
- determining that the second ambient light level is greater than the first ambient light level;
- causing the second solar panel to be reconnected to the first rechargeable battery and the second rechargeable battery; and
- causing the first solar panel to be disconnected from the first rechargeable battery and the second rechargeable battery.

19. The method of claim 12, further comprising:
- determining that the sum has decreased from a first value to a second value; and
- causing the voltage potential of the first rechargeable battery and the second rechargeable battery to be modified to a value equal to or less than the second value.

20. A system to charge batteries using solar panels, the system comprising:
- a plurality of rechargeable batteries;
- a first solar panel configured to charge the plurality of rechargeable batteries;
- a second solar panel configured to charge the plurality of rechargeable batteries; and
- a controller configured to:
  - determine a combined voltage potential of the first rechargeable battery and the second rechargeable battery at a first timestamp;

determine a sum of a first electrical output voltage of the first solar panel and a second electrical output voltage of the second solar panel at the first timestamp;

determine that the first electrical output voltage of the first solar panel is greater than the second electrical output voltage of the second solar panel;

cause the second solar panel to be disconnected from the first rechargeable battery and the second rechargeable battery determine that the combined voltage potential is greater than the sum at the first timestamp; and configure a connection between the first rechargeable battery and the second rechargeable battery based at least in part on the first electrical output voltage and the second electrical output voltage, such that the combined voltage potential of the first rechargeable battery and the second rechargeable battery is equal to or less than at least one of the first electrical output voltage and the second electrical output voltage.

* * * * *